R. A. THOM.
RETURN END AND METHOD OF MAKING SAME.
APPLICATION FILED AUG. 26, 1919.
1,425,495.
Patented Aug. 8, 1922.
6 SHEETS—SHEET 1.
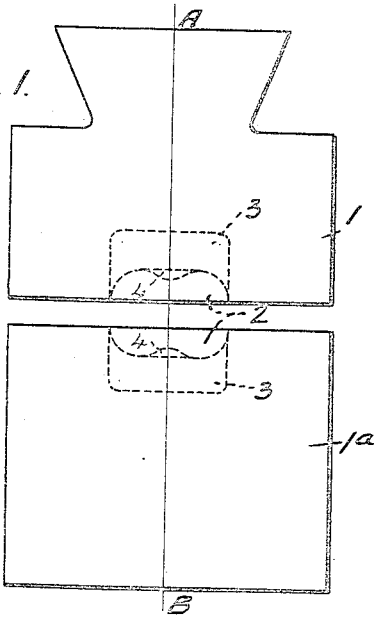
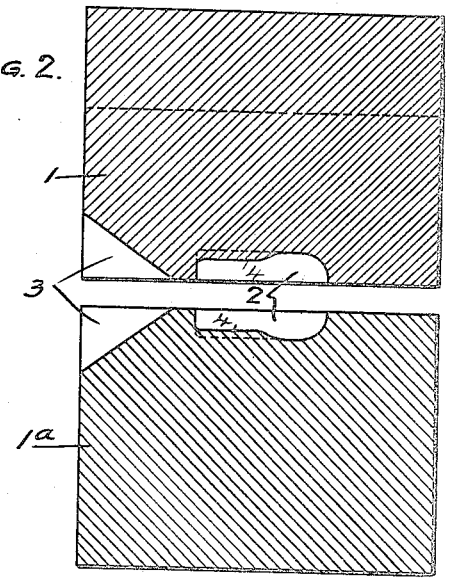
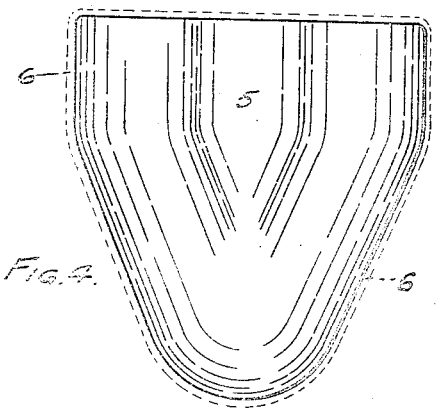
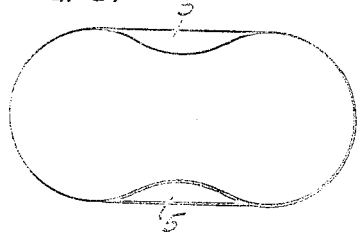
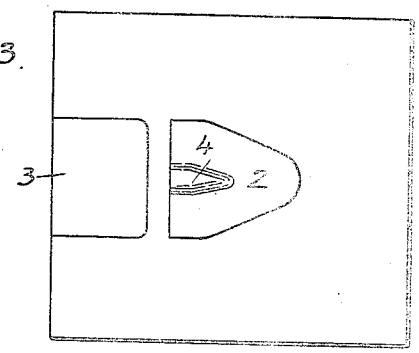
Inventor
Robert A. Thom
by Herbert W. Jenner
Attorney R. A. THOM.
RETURN END AND METHOD OF MAKING SAME.
APPLICATION FILED AUG. 26, 1919.
1,425,495.
Patented Aug. 8, 1922.
6 SHEETS—SHEET 3.
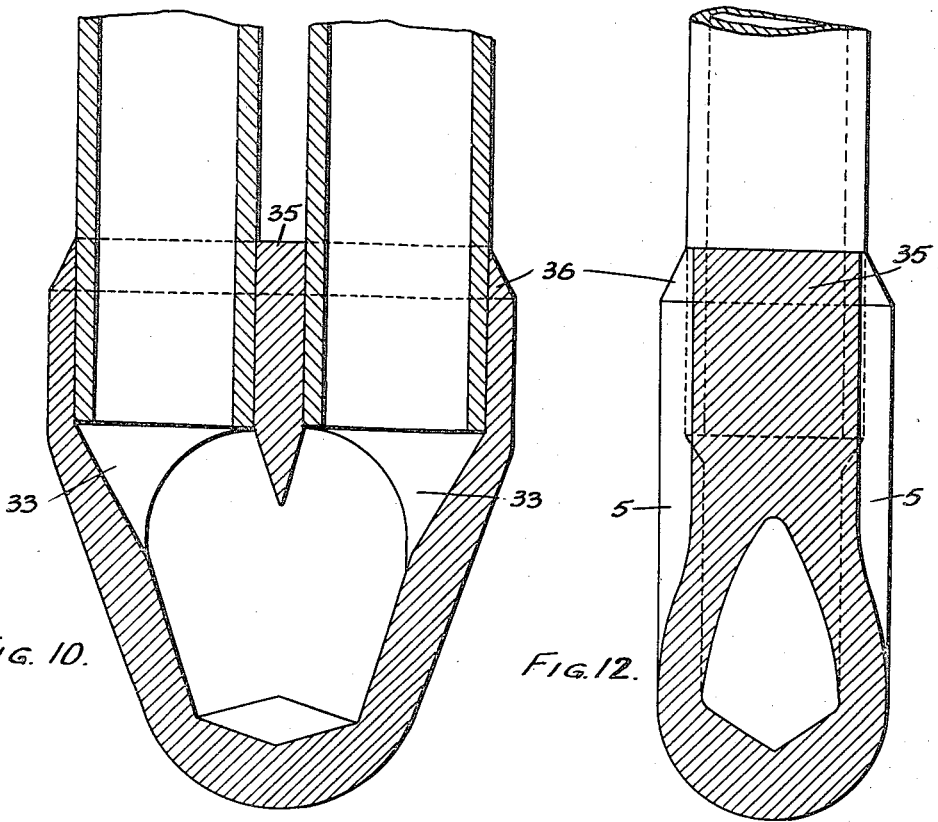
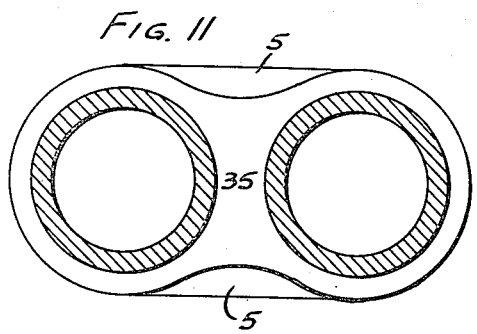
Inventor.
Robert A. Thom
by Herbert W. Jenner
Attorney.

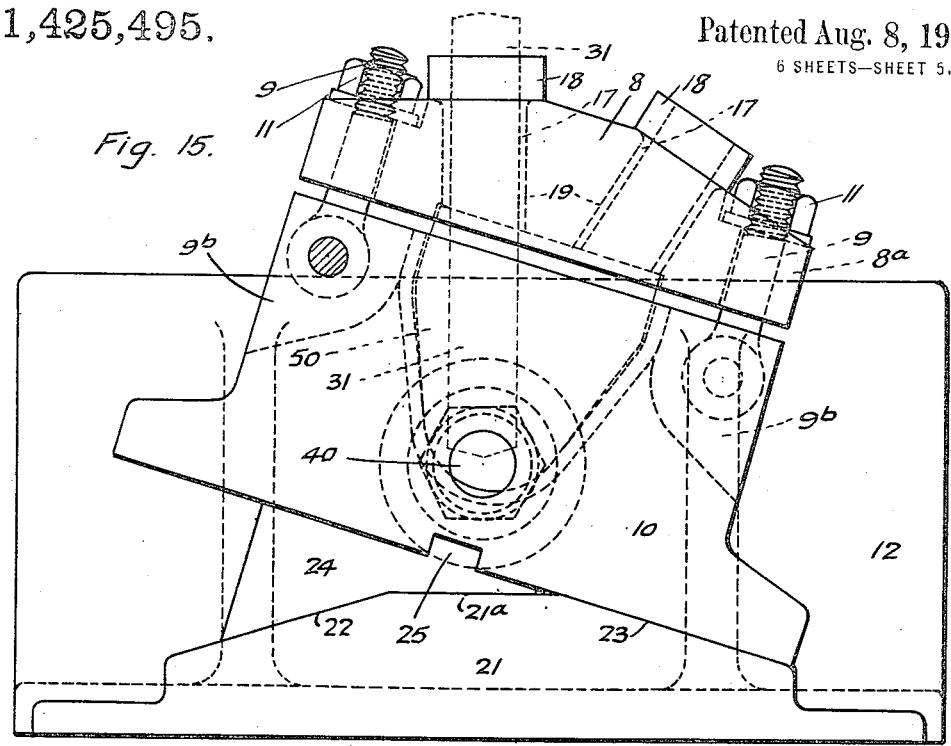
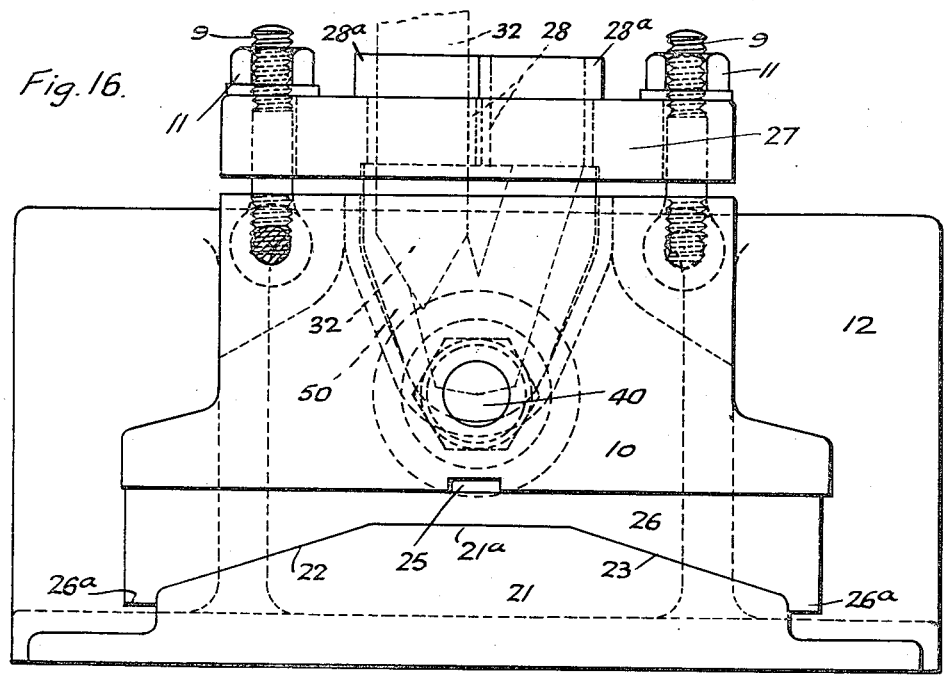

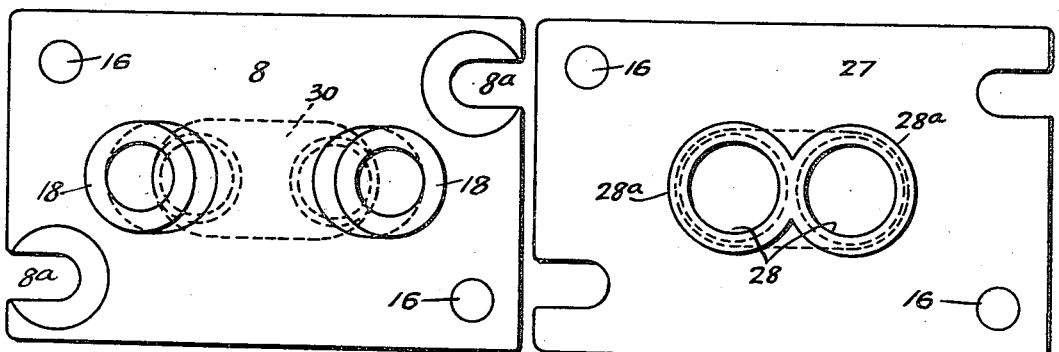
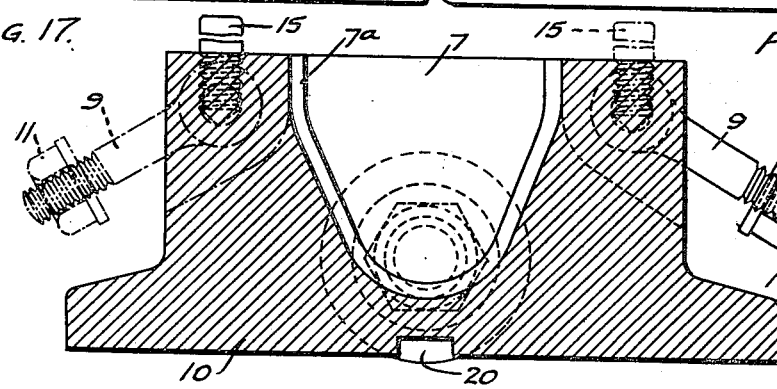
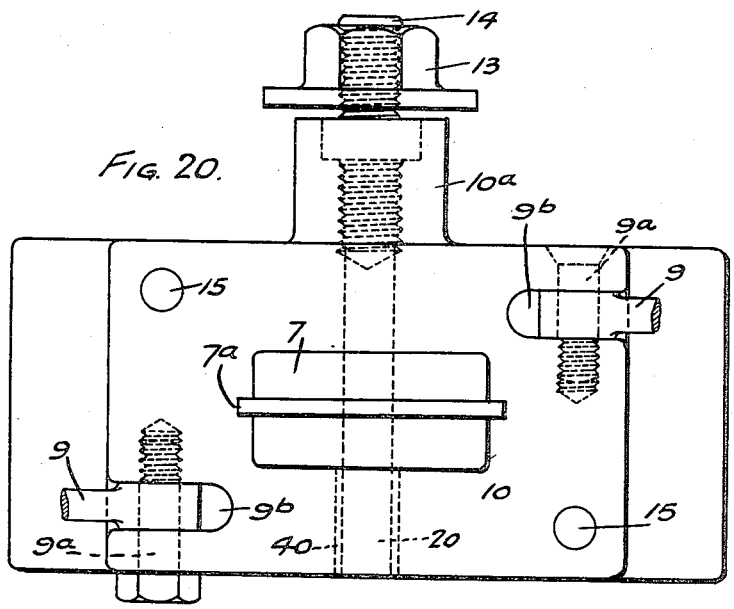

UNITED STATES PATENT OFFICE.

ROBERT ABSALOM THOM, OF MANCHESTER, ENGLAND, ASSIGNOR TO THE SUPER-HEATER CORPORATION LIMITED, OF LONDON, ENGLAND.

RETURN END AND METHOD OF MAKING SAME.

1,425,495.           Specification of Letters Patent.    Patented Aug. 8, 1922.

Application filed August 26, 1919. Serial No. 320,054.

*To all whom it may concern:*

Be it known that I, ROBERT ABSALOM THOM, a subject of the King of Great Britain and Ireland, residing at Manchester, England, (whose post-office address is 11 Leven Terrace, Fairfield, Manchester, in the county of Lancaster, England,) have invented certain new and useful Improvements in Return Ends and Methods of Making Same; and I do hereby declare the following to be a full, clear, and exact description of the invention, such as will enable others skilled in the art to which it appertains to make and use the same.

This invention relates to steam superheated pipes or elements of the U-loop or return U-pipe type such for instance as those employed in steam superheaters for locomotive and marine boilers.

The invention consists in improvements in or relating to steam superheater elements or pipes of the type mentioned, and, more particularly to improved return ends or connectors for the pipes of such elements and to an improved method of manufacturing such ends or connectors.

The present invention has for its principal objects to produce a wrought weldless, preferably mild steel, return superheated pipe end capable of withstanding very high temperature without deterioration of the metal, and to produce such a return end by a simple and economical method of manufacture.

To provide return ends or torpedo ends of the kind heretofore employed on superheater pipes it has been customary to bend the ends of the two pipes to be united and weld them at the longitudinal joint by means of the oxy-acetylene or other suitable process of welding, and in some cases malleable cast iron and cast steel ends have been provided on superheater pipes.

To avoid the above mentioned deterioration of the metal, incidental to the return ends heretofore, employed, it is desirable to provide the superheater pipes with return ends formed without any welding and of material which approximates in quality to that of the metal of which the superheater pipes are made, and this desirable end is attained by means of this invention.

It has heretofore been proposed to make return ends or connectors for the pipes of U-loop steam superheater elements and the like by forging drop stamping or like operations on a solid bar or piece of steel, a hollow forging being thus produced which when reheated is subjected to a further stamping, pressing or like operation so as to press together the central portions of the side walls of the forging these portions being subsequently welded together so as to form a bridge or partition between the orifices at the base or end of the forging to which the pipes of the element are connected.

According to this invention a weldless wrought metal,—preferably mild steel,—return end or connector is made from a solid bar or piece of metal of suitable dimensions by a drop forging, stamping or like operation the piece of metal, (or a portion of the solid bar) being thus formed of the desired external contour which would preferably be the contour of the finished article; in this solid shaped piece two holes are then formed, by any suitable method or operation, these holes extending from the base or wider end of the shaped piece to a suitable distance from the opposite end where they meet or intersect so as to provide the necessary throughway for the passage of steam, an integral portion of the forging or stamping forming a wall or partition separating these holes at their outer ends where the pipes of the element are secured to the return end, there being no welding of any kind in the return end.

Further according to this invention a return end or connector for the pipes of U-loop superheater elements and the like consists of a weldless mild steel drop stamping or forging of suitable shape in which the throughway or steam passage, which forms communication between the pipes of the element, is formed by removing metal from the solid shaped forging by drilling or other suitable milling or cutting operations.

Further for providing the above mentioned throughway or steam passage in the solid forging the forging is placed in a suitable angular drilling jig and is drilled at its base or wider end so as to provide two cylindrical holes arranged at a suitable angle to each other and so that the said holes meet or intersect within the shaped forging at a suitable distance from the apex or narrower end thereof so as to leave a suitable substantial thickness of metal at this end. After these angularly arranged holes have been produced the outer ends or portion of these holes terminating at the base or wider end of the shaped piece, are drilled or machined so as to be parallel with each other and preferably of such a size as to receive the ends of the two pipes of the element to be united by the return end, these drilled holes in the end being separated by an integral portion or web of metal forming an integral part of the end. If desired the above mentioned parallel portions of the holes drilled in the end may be of a size or diaemeter equal to the internal diameter of one of the superheater pipes.

Further in order that the cross area of the steamway through the return end shall at no point be less than the cross area of one of the superheater pipes surplus metal is removed from the interior of the above mentioned drilled passages by means of a suitable drilling or milling tool formed with a suitable angle for instance 60°.

The ends of the superheater pipes to be connected by the return end or connector are preferably secured to the return end by being inserted in the above mentioned parallel portions of the drilled holes forming the steamway through the end and being shrunk on the pipes which are also preferably attached to the base or wider end of the forging by welding. If desired the ends of the pipes could be butt-welded to the base or wider end of the above mentioned return end in which case the aforesaid portions of the holes in the wider end would be of a diameter equal to that of the internal diameter or bore of one of the pipes.

It will be understood that as only one forging operation is required in the production of a return end or connector according to this invention, no reheating of the metal is necessary.

In order that the invention may be more readily understood and carried into effect reference is made to the accompanying drawings in which:—

Fig. 1 shows an end elevation of the upper and lower dies suitable for producing the solid shaped forging.

Fig. 2 is a longitudinal sectional elevation on the line A—B Fig. 1.

Fig. 3 is a plan view of the faces of the die blocks shewn in Figs. 1 and 2.

Figs. 4, 5 and 6 are respectively a side elevation, a central vertical section, and a plan view of the solid shaped forging produced by means of the dies shewn in Figs. 1 and 2.

Figs. 10, 11 and 12 are similar views to Figs. 7, 8 and 9 but shew the return end of the connector attached to the ends of the superheater pipes.

Figs. 17 to 20 inclusive show details of the jig hereinafter described.

Figure 21:
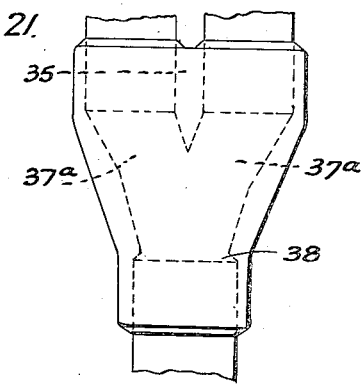

Fig. 21 shows a connector, made according to this invention, for connecting two pipes to a third larger diameter pipe.

Like reference numbers indicate corresponding parts in the several figures of the drawings.

As shewn in Figs. 1, 2 and 3, the upper movable die 1 and lower fixed die 1ª have formed in their adjacent faces suitably shaped recesses 2 identical in both dies, 3 being cut away portions of the die blocks to enable the solid bar to be readily broken off from the portion thereof which has been operated upon by the dies. As shewn in Figs. 1 and 3, a suitable projection 4 is provided in the recess 2 of the die blocks so as to produce the depression 5 in the forging shewn in Figs. 4, 5 and 6.

It will, of course, beunderstood that the block or bar of metal from which the forging shewn in Figs. 4, 5 and 6 is produced is suitably heated before being operated upon by the dies shewn in Figs. 1 and 2.

The hereinbefore mentioned throughway or steam passage is now formed in the solid forging shewn in Figs. 4, 5 and 6. The forging, which in practice would, as the result of the forging operation, have left on it a slight fin or rib of metal indicated by dotted lines marked 6 in Figs. 4 and 5, is placed in the suitably shaped recess 7 in the rotatably mounted or angularly movable member or part 10 (see for instance Figs. 15 and 16) of the jig, the portion 7ª of this recess accommodating the above mentioned fin or rib 6 on the forging, and the forging is held in the recess 7 by means of the upper part or drill guide 8 (Figs. 15 and 17) of the jig which is secured in position by means of the swivelling bolts 9 mounted on pivots 9ª in suitable recesses 9ᵇ in the part 10 of the jig, 11 being nuts screwed up on the bolts 9 so as to hold the plate or block 8 in position. As shewn in Fig. 15 the bolts 9 lie in notches or slots 8ª, Figs. 15 and 17, in the block 8. As shewn more clearly in Figs. 13, 14 and 20, the part 10 of the jig is provided with a cylindrical projection or spigot 10ª adapted to enter a corresponding hole in the bracket or support 12 which can be suitably clamped or secured in position on a suitable support, for instance on the table of a drilling machine, the aforesaid part 10 of the jig being secured to the bracket or support 12, in the required position, by means of a nut 13 screwed up on the outer end of the screw stud 14 the inner end of which is screwed into the spigot or projection 10ª.

Figure 13:
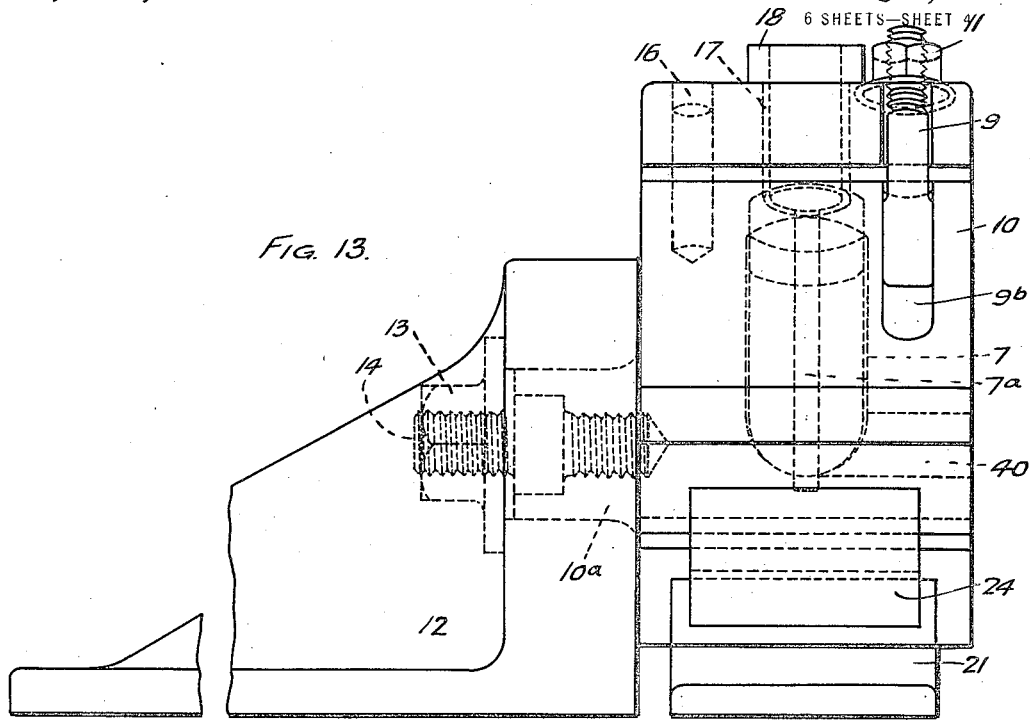
Figs. 13 and 14 are side elevations of a jig employed in the drilling of the through-way or steam passage through the return end, Figs. 15 and 16 being end views of this jig.
Figure 14:
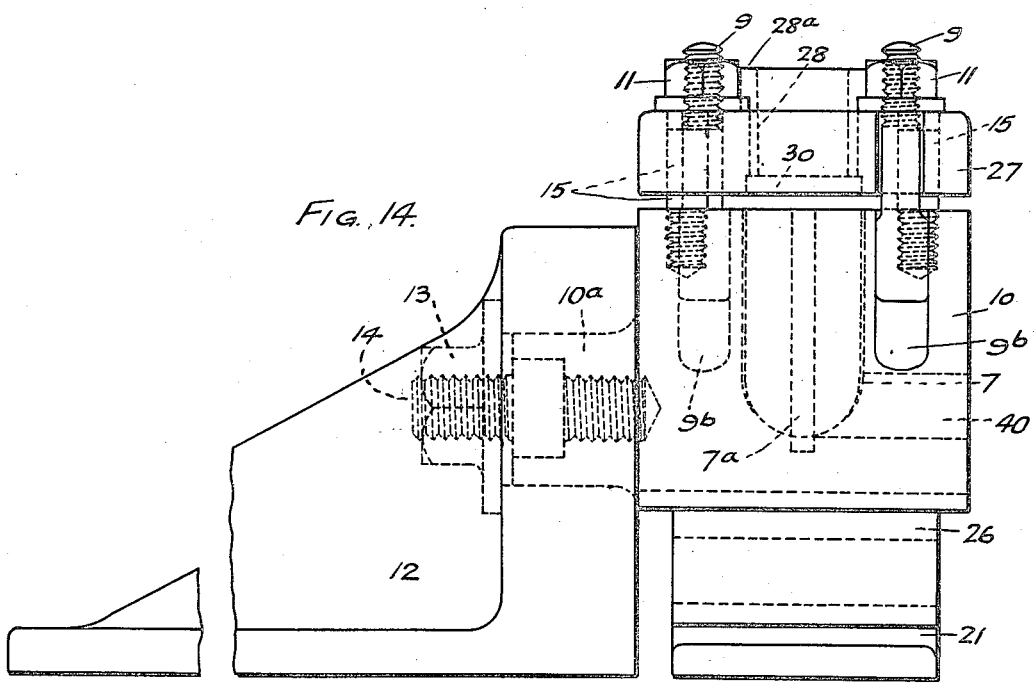

As shewn in Fig. 20 the pivots 9ª on which the bolts 9 are carried are screwed into holes in the part 10 of the jig, the pivot 9ª entering the rear face of the part 10 having a countersunk head so as to lie flush with the said face which, as shewn in Figs. 13 and 14, lies against the face of the vertical portion of the above mentioned bracket 12.

15, Figs. 13, 14, 18 and 20, are pins or dowels screwed into and projecting from the top of the member 10, and 16, Figs. 13 and 17, are holes in the upper part or drill guide 8 adapted to be passed on to the dowels 15 when the member or part 8 is placed in the position shewn in Figs. 13 and 15.

17 Figs. 15 and 17 are hard steel bushes inserted in the block or member 8 of the jig these bushes 17 being provided with enlarged heads or collars 18 at their outer ends. The bushes 17, which form guides for the drill employed for performing the drilling operation hereinafter described, are inserted in holes 19 in the member 8 these holes 19 being set at suitable angles to each other for performing the drilling operations hereinbefore mentioned. The bushes 17 can be readily removed from the member 8 when worn and replaced by new bushes. 20, Figs. 15, 16 18 and 20 is a groove or channel formed transversely and centrally in the bottom of the member 10 of the jig this groove being provided for the purpose hereinafter mentioned. 21, Figs. 13, 14, 15 and 16, is a block of steel or other suitable metal, the said block having formed on it the horizontal face 21ª and the angularly arranged faces 22 and 23 as shewn in Figs. 15 and 16. The faces 22 and 23 act as abutments or stops for limiting the angular position of the member 10 of the jig the said faces being formed or arranged at the required angle relative to the horizontal face 21ª. 24 is a filling piece or block, of steel or other suitable metal, and of wedge-like form and having its lower side formed with faces adapted to fit or abut against the faces 21ª and 22 as shewn in Fig. 15, or 21ª and 23 as the case may be. The block or wedge member 24 has formed on it a rib or projection 25 adapted to slidably fit in the hereinbefore mentioned channel 20 in the bottom of the member 10 for the purpose of retaining the block 24 in the position shewn in Fig. 15, also in the position in which the faces on the lower side of the said block 24 rest on the faces 21ª and 23. From the foregoing it will be understood that the block 24 co-operating with the block 21 is adapted to hold the member 10 of the jig either in the angular position shewn in Fig. 15 or in the opposite angular position in which the bottom of the member 10 would bear upon the face 22 on block 21 in which latter case the block 24 would be placed between the faces 21ª and 23 and the right hand portion of the bottom of the member 10.

26, Fig. 16 is another block of steel, or other suitable metal, the lower side of which is formed with faces corresponding to the faces 21ª, 22 and 23 on the above mentioned block 21, the block 26 being also preferably provided with overhanging portions or projections 26ª at its ends these projections engaging the sides of the block 21 as shewn in Fig. 16. The block 26 cooperating with the block 21 serves to hold the member 10 of the jig in the position shewn in Fig. 16 for performing the hereinbefore mentioned operation of drilling the outer ends of the angularly arranged holes in the forging which form the steam passage therethrough. 27, Figs. 16 and 19, is a drill guide or block employed when the operations of drilling out these outer ends of the holes in the forging are being performed, the block or member 27 being used in place of the block or member 8 which latter is used in drilling the angularly arranged holes in the forging. The centre lines of these angularly arranged holes are indicated by dotted lines in Fig. 7 of the drawings. 28 are hard steel bushes fitted in holes 29 in the block 27, the said holes being vertical and parallel with each other as shewn. Each of the bushes 28 is provided with a flange or collar 28ª at its outer end as shewn, and these bushes act as guides for the drill employed in drilling the outer parallel portions of the holes forming the steam-way through the return end.

Each of the blocks or members 8 and 27 has formed in its lower face a recess 30, Figs. 15, 16, 17 and 19, into which the base or wider end of the forging projects when the forging is placed in the jig for drilling.

31, Fig. 15 indicates in dotted lines the drill employed for drilling the angularly arranged holes in the forging. The dotted lines marked 32 in Fig. 16 indicate the drill employed in drilling the outer ends of the holes produced by the drill 31 so that these end portions are parallel with each other, the drilling operation performed by the drill 32 also clearing out, as indicated at 33 Figs. 7 and 10, surplus metal so as to provide the requisite cross sectional area throughout the steamway or passage through the forging.

Figure 7:
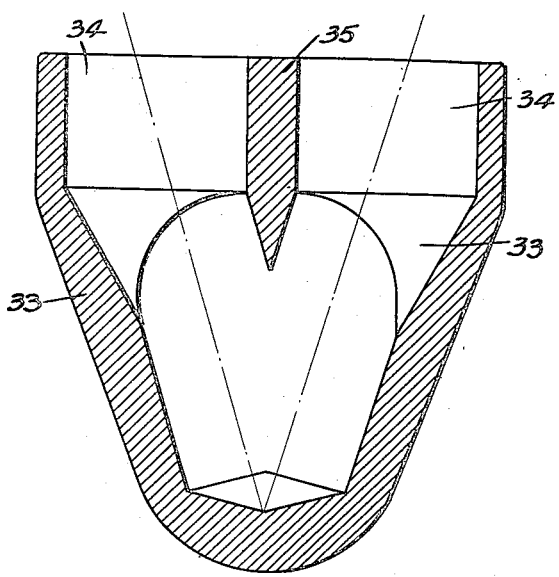
Fig. 7 is a sectional elevation of a complete return end or connector according to this invention, Fig. 8 being a plan view of the complete connector and Fig. 9 a transverse section on the line C—D Fig. 8.

The enlarged diameter parallel arranged outer portions of the holes drilled in the forging are marked 34 in Fig. 7. As shewn in Figs. 7 and 9 a substantial thickness of metal is left at the apex or narrower end of the forging i. e. at the end exposed to the highest temperature as in the case of superheater elements fitted in smoke tubes of a locomotive boiler.

Figure 9:
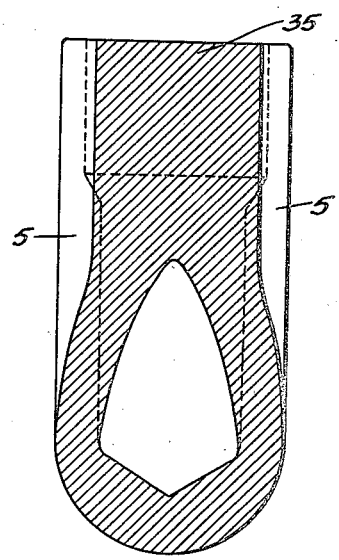
Figure 8:
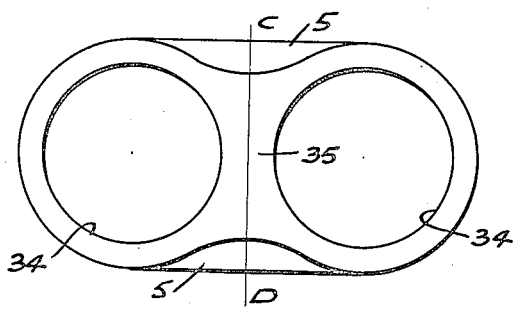

35 Figs. 7, 8 and 9 indicates the bridge-piece or partition separating the outer parallel portions 34 of the holes forming the steamway through the return end, the said bridge or partition being, as shown, an integral portion of the forging without any welding.

40, Figs. 13, 14 and 20 is a hole or passage formed in the member 10 of the jig, extending from the front face thereof and communicating at its inner end with the bottom of the hereinbefore mentioned recess 7 in the member 10. This hole 40 is provided for the purpose of clearing out small pieces of metal or dirt or other objectionable matter which might accumulate in the bottom of the recess 7.

It will be seen that the hereinbefore described blocks or members 8 and 27 of the jig serve, by means of the bolts 9 and nuts 14 to firmly hold or clamp the solid shaped forging in the recess 7 of the member 10 during the drilling operations hereinbefore described.

By forming the outer ends or portions 34 (Fig. 7) of the holes forming the steam passage in the forging so that these portions lie parallel with each other no bending or setting of the ends of the superheater pipes is necessary for connecting the pipes to the return end.

It will be seen that the parallel arranged outer portions 34 (Fig. 7) of the holes forming the steam passage through the return end form sockets adapted to receive the ends of the superheater pipes (see Fig. 10) and whereby the return end can be effectively shrunk on to and thus secured to the ends of the pipes.

For performing the aforesaid drilling operations, to produce the throughway or steam passage in the solid forging shewn in Figs. 4, 5 and 6, the said forging is placed in the recess 7 in the member 10 of the jig. The forging is shewn in dotted lines, Figs. 15 and 16, marked 50, in the said recess 7 and as shewn projects with its base or wider end above the top of the member 10 and into the hereinbefore mentioned recess 30 in the block or member 8 (or 27 as the case may be) of the jig. To produce the hereinbefore mentioned intersecting holes in the forging the member 10 of the jig with the member 8 in the position shewn in Fig. 15, clamping the forging 50 in position in the recess, is turned to the angular position shewn in Fig. 15 in which it is held by means of the hereinbefore mentioned block or wedge piece 24 the left hand drill guide or bush 18 being then in the vertical position as shewn. The drill is now inserted in the bush 18 and operated so as to drill the hole of the required depth in the solid forging. When this drilling operation has been completed, the drill is removed and the block or wedge piece 24 is also removed, whereupon the members 10 and 8 of the jig with the forging 50 therein are turned in the anticlockwise direction into the opposite angular position to that shewn in Fig. 15, i. e. to the position in which the bottom of the member 10 rests on the angular face 22 of the hereinbefore mentioned block 21, and the block or wedge piece 24 is then inserted between the faces 23 and 21ª and the bottom of the member 10. When this has been done the right-hand drill guide or bush 18, Fig. 15 will be in the central vertical position (previously occupied by the bush 18 when the first drilling operation was being performed) and the other hole is drilled to the required depth in the solid forging and in this drilling operation the inner end of this hole cuts into or intersects the previously drilled hole so that the two holes are thus in communication at their inner ends and the integral bridge piece or partition 35 is left separating the outer ends of these holes. When these drilling operations have been completed the member or block 8 is removed as also the block or wedge piece 24, and the member 10 of the jig is then turned to the vertical position shewn in Fig. 16 and is maintained or supported in this position by the hereinbefore mentioned block 26 as shewn in Fig. 16. In place of the drill guide block or member 8 the block or member 27 is applied as shewn in Fig. 16 and the drill 32 is employed to drill the outer end portions of the holes formed by the previous drilling operations so as to make these portions (34 Fig. 7) lie parallel with each other. In this drilling operation, as previously mentioned, the drill 32 removes surplus metal at 33 Fig. 7. This surplus metal might, if desired, be removed by a drilling or milling operation subsequent to that described with reference to Fig. 16. This completes the drilling operation and on the forging being removed from the jig the fin or rib of metal indicated at 6, Figs. 4 and 5, can be removed by grinding off or other suitable operation. It will be understood of course that this fin or rib might be if desired removed before the drilling operations are performed.

The complete weldless return end having been produced as above described is suitably secured to the ends of the pipes of the element to be united by the said return end. Preferably the return end is secured to these pipes by inserting the ends of the pipes in the outer portions 34 of the drilled holes or throughway in the end and shrinking the end on the pipes and subsequently welding the pipes to the return end as indicated at 36 Figs. 10 and 12 by the oxy-acetylene or other welding process.

It will be seen that as above described there is no weld of any kind in the return end itself. The absence of all welded joints from the return end, including the bridge piece or partition 35, avoids the liability of such joints being destroyed, or opening out, due to the severe conditions and very high temperature to which the return ends of superheater elements are subjected in use.

The invention as hereinbefore described is also applicable for producing a weldless wrot connector, of mild steel or other suitable metal, of the form shewn in Fig. 21, suitable dies being of course employed for producing the solid forging in which the throughway or steam passages are subsequently formed by drilling operations in a similar manner to that hereinbefore described. In this case however, in addition to the angularly arranged holes drilled in the forging and intersecting at their inner ends as hereinbefore described, another larger diameter hole is drilled in the opposite end of the forging so as to break into or communicate with the two angularly drilled holes. This connector (Fig. 21) is adapted to have connected to it at one (its wider) end two pipes and at its other end another, larger diameter pipe the cross sectional area of which latter pipe may be equal to the combined cross areas of the other two pipes. The angularly arranged holes in Fig. 21 are indicated by the numbers 37 and 37$^a$ and the larger diameter hole is marked 38.

What I claim as my invention and desire to secure by Letters Patent is:—

1. A return end or coupling for pipes, comprising a weldless block of wrought metal having a passage formed of two substantially parallel holes adapted for connection with the pipes, said holes being separated by a bridge piece formed integral with the block, and two holes arranged at an angle to each other and communicating with each other at one end and operatively connected with the aforesaid holes at the other end.

2. A return end or coupling for pipes, comprising a weldless block of wrought metal having a passage formed of two substantially parallel holes adapted for connection with the pipes, and two straight cylindrical holes arranged at an angle to each other and communicating with each other at one end and operatively connected with the aforesaid holes at the other end.

3. A return end or coupling for pipes, comprising a weldless block of wrought metal having a passage formed of two substantially parallel holes adapted for connection with the pipes, two straight cylindrical holes arranged at an angle to each other and communicating with each other at one end, and two conical holes arranged axially in line with the first said holes and operatively connecting them with the other end portions of the two holes arranged at an angle to each other.

4. A return end or coupling for pipes, comprising a weldless block of wrought metal having a passage provided with two inner straight cylindrical portions or holes which open into or intersect each other at one end in the block, and two outer portions arranged substantially parallel to each other and adapted for connection with the pipes, the said outer portions being separated by a bridge piece formed integral with the block.

5. The method of making a return end or coupling for pipes, which consists in drilling two holes in a block of metal at an angle to each other and until they intersect and communicate at their inner ends, and then forming substantially parallel holes in the block at the outer ends of the aforesaid holes to afford a means for connecting them with the pipes.

6. The method of making a return end or coupling for pipes, which consists in drilling two holes in a block of metal at an angle to each other and until they intersect and communicate at their inner ends, and then forming two substantially parallel holes having straight cylindrical outer portions and conical inner portions which connect their straight cylindrical portions with the outer end portions of the first said holes.

In testimony whereof I affix my signature, in presence of two witnesses.

ROBERT ABSALOM THOM.

Witnesses:
W. NOOSEN,
W. H. SIXESON.